United States Patent [19]

Jochmann et al.

[11] 4,295,052
[45] Oct. 13, 1981

[54] CIRCUIT FOR MOTOR VEHICLES

[75] Inventors: Franz Jochmann, Munich; Helmar Jedeck, Oberschleissheim, both of Fed. Rep. of Germany

[73] Assignee: Bayerische Motoren Werke Aktiengesellschaft, Munich, Fed. Rep. of Germany

[21] Appl. No.: 22,632

[22] Filed: Mar. 21, 1979

[30] Foreign Application Priority Data

Mar. 23, 1978 [DE] Fed. Rep. of Germany ....... 2812721

[51] Int. Cl.³ ............................................. B60R 27/00
[52] U.S. Cl. .................................. 307/10 R; 219/202; 362/100
[58] Field of Search .................... 307/10 R, 10 LS; 362/100, 800; 70/255; 219/200, 201, 202, 203, 205, 208; 362/61

[56] References Cited

U.S. PATENT DOCUMENTS 2,232,577  2/1941  West, Jr. ................... 219/201 X
2,538,872  1/1951  Jones ......................... 219/201 X
3,744,046  7/1973  Tamasi ...................... 219/205 X
3,784,760  1/1974  Rickert ....................... 362/800 X
3,908,149  10/1975 Gergoe et al. ............. 362/100 X
4,122,371  10/1978 Talmage et al. .......... 307/10 LS X

FOREIGN PATENT DOCUMENTS 2628150  1/1978  Fed. Rep. of Germany .

Primary Examiner—L. T. Hix
Assistant Examiner—James L. Dwyer
Attorney, Agent, or Firm—Craig and Antonelli

[57] ABSTRACT

A circuit arrangement for motor vehicles including a circuit responsive to operation of an actuating device of a door and/or flap lock of the motor vehicle for being energized. A timer is also responsive to the operation of the actuating device for providing a predetermined switching period with the circuit being responsive to the elapse of the predetermined switching period of the timer for being automatically de-energized. The circuit includes a door and/or flap lock heater and at least one additional load device with the at least one additional load device being energized when the motor vehicle is opened.

18 Claims, 1 Drawing Figure

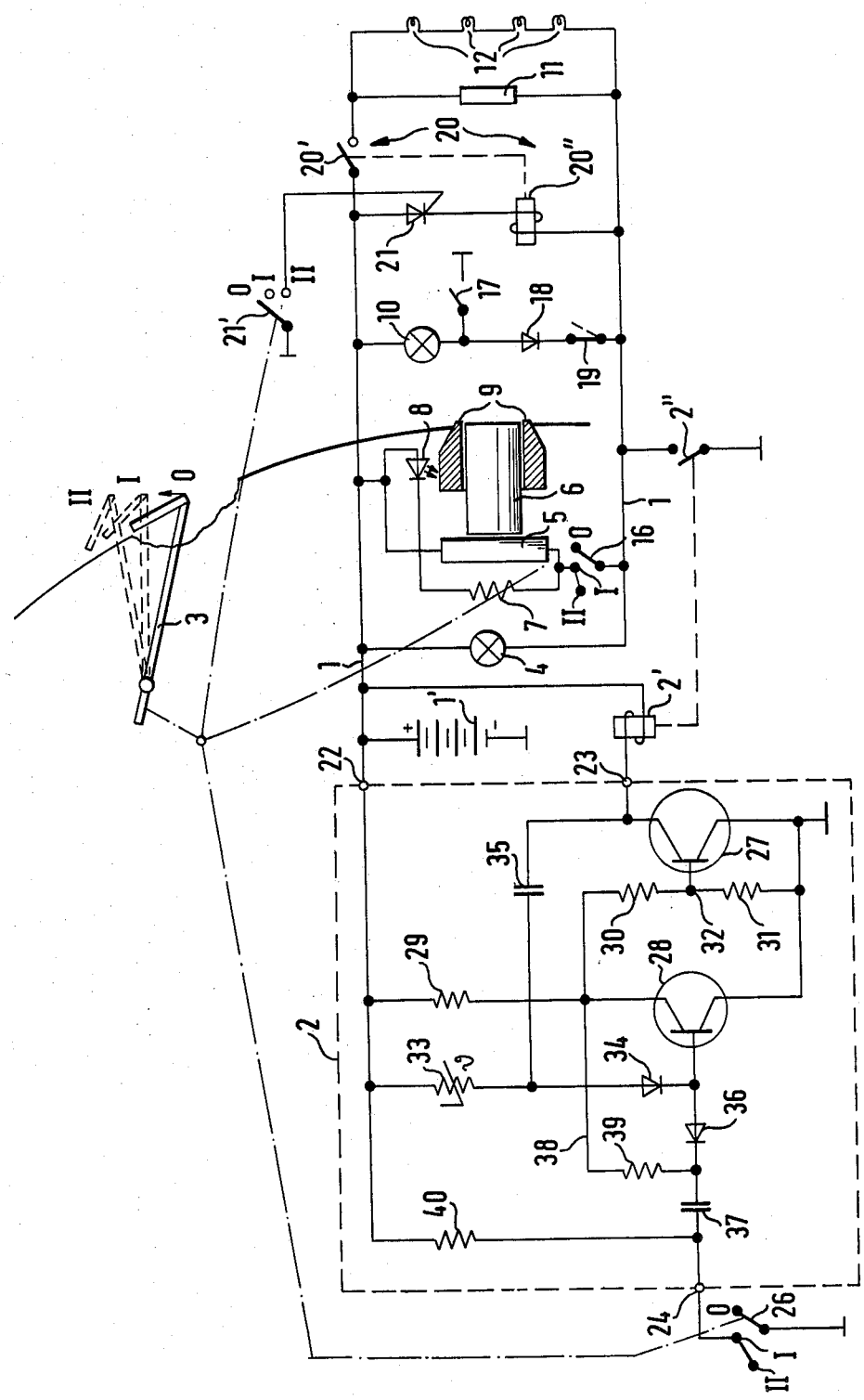

CIRCUIT FOR MOTOR VEHICLES

The present invention relates to a circuit for motor vehicles wherein the circuit is energized in response to actuation of an actuating device of the motor vehicle and is automatically de-energized after a predetermined switching time by a timer which is energized in an operating position of the actuating device.

German patent application No. P 26 28 150.5 provides a circuit arrangement wherein a heating element of a door and/or flap lock is provided in a circuit, which heating element is energized in response to actuation of an actuating device. When the actuating device remains in the actuating positions, a timer which is energized by the actuating device ensures that only a single heating period will elapse and thereby keeps the load on the battery of the motor vehicle at a low level.

It is an object of the present invention to provide a circuit arrangement which enables at least one additional electrical consumer or load device other than a door and/or flap lock heater to be energized when the motor vehicle is opened.

In accordance with the present invention, the at least one additional electrical consumer or load device may be, for example, a door lock light, a heater for a window pane or a seat of the vehicle and/or in the case of a motor vehicle with a diesel engine, glow plugs which must be warmed up before starting of the diesel engine. The at least one additional load device is connected in the circuit of the motor vehicle and arranged for energization in response to actuation of the actuating device and for de-energization at least in response to the switching period of the timer energized in response to the actuating device having elapsed.

In accordance with a feature of the present invention, the load on the battery in the vehicle's electrical system is thereby even further reduced in that the additional load device is energized only when the actuating device is moved to a position beyond the actuating position for the lock. This energization or connection in the operative circuit is only accomplished when desired. Thus, the door of the vehicle is able to open in a position of the actuating device prior to the actuating device being moved to the additional position and maintains the additional load device de-energized in the normal case.

In accordance with another feature of the present invention, the additional load device may be de-energized independently of the position of the actuating device after once being energized rather than being de-energized in accordance with the position of the actuating device. That is, in the German patent application, the door and/or flap lock heater is directly de-energized when the actuating device is returned to a rest position before the switching time of the timer has elapsed. While the additional load device may be arranged for de-energization simultaneously with the door and/or flap lock heater, by providing for independent de-energization, the additional load device can be maintained energized for a longer period of time by having the additional load device de-energized in response to the timer even though the actuating device is returned to the rest position before the switching time of the timer has elapsed and yet will always be de-energized when the switching time of the timer has elapsed. This provides additional protection against unnecessary drainage of the battery when the actuating device is left in the actuating position.

These and further objects, features and advantages of the present invention will become more obvious from the following description when taken in connection with the accompanying single FIGURE drawing which shows, for purposes of illustration, a single embodiment in accordance with the present invention.

As illustrated in the single FIGURE, there is provided a circuit arrangement for motor vehicles including a circuit 1 connectable to an electrical consumer or load device in the form of a door lock heater 5 and to additional electrical consumers or load devices which are energized in accordance with an actuating device of a door lock in the form of a flap-like actuable door handle 3, which has two actuating positions I and II for opening the door in addition to a resting position 0. The assumption of the actuating position II requires an increased application of force relative to actuating position I because of a conventional spring-force mechanical system.

The plurality of load devices are connected in parallel in circuit 1 of the motor vehicle connected to a battery 1'. The load devices are connectable by means of the actuating device of the door lock and are disconnectable by a timer 2. The load devices can be used in any combination and include, for example, an incandescent light 4 for interior illumination, the electrical heating element 5 for a lock cylinder 6 of the door lock, a light-emitting diode 8 connected in series with a protective resistor 7 to illuminate a light ring 9 surrounding the lock cylinder 6, a pilot light 10 for an operating function, a heating element 11 to heat a seat or a window pane, especially a rear window, as well as glow plugs 12 for a diesel engine.

The heating element 5, which may be provided with a thermoswitch, on the one hand, and the protective resistor 7 and light-emitting diode 8 on the other hand, are connected in parallel with one another and are connected in turn in series with a switch 16, which switch is connected to the door handle 3 and becomes closed when the door handle is in operating positions I and II.

The pilot light 10 can be connected to ground through a sensor in the form of switch 17, which serves for sensing an operating function such as the brake fluid or engine oil level. When the operating function is in an abnormal condition, switch 17 is closed. The pilot light 10 is also connected in series with a diode 18 and a switch contact 19 of a motor oil pressure switch wherein switch contact 19 closes below a preset motor oil pressure.

The heating element 11 and glow plugs 12 connected in parallel therewith are connected through a working contact 20' of a relay 20 with a coil 20" in circuit 1. The coil 20" is connected in series with a thyristor 21, which can be ignited through a switch 21'. The switch 21' is connected to the door handle 3 such that when the handle is in the operating position II, switch 21' provides a connection of the gate of thyristor 21 to ground for enabling firing of the thyristor.

The timer 2 is provided with terminals 22, 23, and 24 with terminal 22 being connected to the battery 1', terminal 23 being connected through a coil 2' of a relay which has a working contact 2", to the circuit 1. The working contact 2" connects circuit 1 to ground. The terminal 24 is connected to ground through a switch 26 connected to the door handle 3, when the door handle is placed in operating positions I and II.

The timer 2 also includes a switching transistor 27 and a control transistor 28 with the collector of the switching transistor 27 being connected to the terminal 23, and the collector of the control transistor 28 being connected through a resistor 29 to the terminal 22. A voltage divider composed of resistors 30 and 31 is connected to the collector of the control transistor 28 with the center tap 32 of the voltage divider being connected to the base of the switching transistor 27. An NTC resistor 33 is connected in parallel with resistor 29 with the resistor 33 being connected through a diode 34 to the base of the control transistor 28 and through a capacitor 35 to the collector of the switching transistor 27. The base of the control transistor 28 is also connected to the terminal 24 through a diode 36 and a capacitor 37. A lead 38 with a resistor 39 is connected between the diode 36 and the capacitor 37 and the collector of the control transistor 28. The terminals 22 and 24 are connected together through an additional resistor 40.

When the door handle 3 is in the resting position 0, the control transistor 28 of the timer 2 conducts, since it receives a preliminary voltage at its base through NTC resistor 33 and diode 34. The switching transistor 27, on the other hand, is blocked, since its base is grounded both through the conductive control transistor 28 and resistor 30, as well as through resistor 31. Hence, circuit 1 is interrupted by working contact 2", since no current flows through coil 2'.

With the door handle 3 in operating positions I and II, and hence with the switch 26 in the operating position connecting terminal 24 to ground, the control transistor 28 is briefly grounded through its base via the switch 26, the capacitor 37, and the diode 36. The control transistor 28 becomes nonconductive and the switching transistor 27 receives a preliminary voltage at its base through the resistors 29 and 30 and conducts such that the terminal 23 becomes grounded through the switching transistor 27. Current flows through coil 2', so that working contact 2" closes circuit 1. At the same time, the capacitor 35 is charged through the NTC resistor 33 until the voltage stored in it is equal to the voltage drain through the diode 34, and is also equal to the base-emitter voltage required to cause the control transistor 28 to conduct. The control transistor 28 conducts when the switching time of the timer 2 elapses with the switching transistor 27 becoming nonconductive such that the flow of current through coil 2' is interrupted and the working contact 2" opens circuit 1.

The switching time of timer 2 depends on the size of the capacitor 35 and upon the NTC resistance 33, which changes as a function of ambient temperature. The switching time is greater at low temperatures than at high temperatures, and can be as long as one minute, for example.

The switching time of the timer is automatic and independent of the position of the door handle 3. In other words, even when the door handle 3 is left in one of the operating positions I or II, or when the door handle 3 is returned to resting position 0 and then moved again into operating positions I or II before this switching time has elapsed, working contact 2", which is controlled by the timer 2 interrupts circuit 1 when the switching time has elapsed.

When the door is opened, the handle 3 is moved to the operating position I, and the timer 2 is started. This turns on the incandescent lamp 4 for the interior illumination, the heating element 5 and the light-emitting diode 8 for the heating and/or illumination of the lock cylinder 6, and the pilot light 10. The lamp 4 is turned on during the entire switching time of the timer 2 and may be additionally controlled by an additional door-contact switch connected in parallel with timer 2 so as to be operated also independently of the timer.

The heating element 5 and light-emitting diode 8 are energized during the switching time of timer 2 only until the door handle 3 is returned to resting position 0, thus opening the switch 16.

If the monitored operating function is properly operating and the switch 17 is open, pilot light 10 will remain on during the switching time of the timer 2 only until the motor oil pressure reaches the preset value and the switch contact 19 opens at the starting of the motor vehicle. If, however, the operating function is not properly operating, the switch 17 remains closed. Therefore, the pilot light 10 continues to be energized even after the switching time of the timer has elapsed and indicates a malfunction in operation.

The heating element 11 and the glow plugs 12 are connected only when it appears necessary because of low outside temperatures, by moving the door handle 3 to the operating position II. In this position, thyristor 21 is ignited through switch 21' and the thyristor maintains the flow of current through coil 20" and hence via the working contact through heating element 11 and glow plugs 12, even when door handle 3 has been returned to the resting position 0, until the switching time of timer 2 has elapsed.

The present invention thus enables the utilization of only a single timer to turn on a plurality of current consumers or load devices with the aid of the actuating device of a door and/or flap lock. The timer provides protection against undesirable drainage of the vehicle battery, since it interrupts the power supply to the load devices at the end of its switching time even when the actuating device of the door lock remains in its actuating position.

While we have shown and described one embodiment in accordance with the present invention, it is understood that the same is not limited thereto but is susceptible of numerous changes and modifications as known to those skilled in the art and we therefore do not wish to be limited to the details shown and described herein, but intend to cover all such changes and modifications as are encompassed by the scope of the appended claims.

We claim:

1. A circuit arrangement for motor vehicles comprising circuit means responsive to operation of an actuating means of the motor vehicle for being energized, the actuating means including an actuating device of at least one of a door and flap lock of the motor vehicle, timer means responsive to the operation of the actuating device for providing a predetermined switching period, the circuit means being responsive to the elapse of the predetermined switching period of the timer means for being automatically de-energized, the circuit means including at least one of a door and flap lock heater and at least one additional load means, the at least one additional load means being energized in response to the actuating means enabling opening of the motor vehicle.

2. A circuit arrangement according to claim 1, wherein the circuit means includes control switch means connected with the actuating device and the at least one additional load means is energized in response to another operation of the actuating device.

3. A circuit arrangement according to claim 2, wherein the at least one additional load means is energized in response to the actuating device being moved to a position beyond the operating position of the at least one of the door and flap lock.

4. A circuit arrangement according to any one of claims 2 or 3, wherein the at least one additional load means is de-energized in response to the elapse of the predetermined switching period of the timer means independently of the position of the actuating device.

5. A circuit arrangement according to claim 4, wherein the actuating device is one of a door and flap handle and is movable from a rest position to at least one operating position to enable opening of one of the door and flap, the actuating device being returnable to the rest position before the predetermined switching period of the timer means having elapsed, the at least one of the door and flap lock heater being de-energized in response to the return of the actuating device to the rest position before the predetermined switching period of the timer means has elapsed.

6. A circuit arrangement according to claim 1, wherein the at least one additional load means is connected in parallel with the at least one of the door and flap lock heater.

7. A circuit arrangement according to claim 6, wherein the actuating device is movable from a rest position to a first position in which the at least one of the door and flap lock heater is energized, the actuating device being movable beyond the first position for enabling energization of the at least one additional load means.

8. A circuit arrangement according to claim 7, further comprising at least one further load means, the at least one further load means being connected in parallel with the at least one of the door and flap lock heater and being energized in response to the actuating device being moved to the first position.

9. A circuit arrangement according to claim 8, wherein the at least one of the door and flap lock heater is de-energized in response to the actuating device being returned to the rest position thereof before the predetermined switching period of the timer means has elapsed, the at least one additional load means being de-energized in response to the elapse of the predetermined switching period of the timer means independently of the position of the actuating device.

10. A circuit arrangement according to claim 9, wherein the at least one further load means includes at least a first load means being de-energized in response to the elapse of the predetermined switching period of the predetermined switching period of the timer means independently of the position of the actuating device.

11. A circuit arrangement according to claim 10, wherein the at least one further load means includes at least a second load means being de-energized in response to the actuating device being returned to the rest position before the predetermined switching period of the timer means has elapsed.

12. A circuit arrangement according to any one of claims 7 or 11, wherein the circuit means includes a thyristor means coupled to a relay means and connected in parallel with the at least one of the door and flap lock heater, the thyristor means being ignited in response to the actuating device being moved beyond the first position for energizing the relay means to enable energization of the at least one additional load means.

13. A circuit arrangement according to claim 12, wherein the at least one additional load means includes a heater for at least one of a seat and window pane of the vehicle.

14. A circuit arrangement according to claim 12, wherein the motor vehicle is provided with a diesel engine and the at least one additional load means includes glow plugs for the diesel engine.

15. A circuit arrangement according to any one of claims 8 or 11, wherein the at least one further load means includes at least one of a lamp for illuminating the interior of the vehicle, a light emitting diode for illuminating the at least one of the door and flap lock, and means for indicating operation of an operating function of the vehicle.

16. A circuit arrangement according to claim 15, wherein the first load means includes the illuminating lamp and the indicating means and the second load means includes the light emitting diode.

17. A circuit arrangement according to claim 11, further comprising relay means responsive to energization of the timer means for establishing an energizing path for the circuit means, the relay means being responsive to the elapse of the predetermined switching period of the timer means for interrupting the energization path for the circuit means.

18. A circuit arrangement according to claim 8, wherein the at least one further means is responsive to the starting of the motor vehicle for being de-energized.

* * * * *